Feb. 24, 1959     S. J. BRADY     2,874,981
COUPLING BETWEEN RIGID AND NON-RIGID TUBULAR MEMBERS
WITH COLLAPSIBLE BUSHING FOR HOLDING
THE MEMBERS ASSEMBLED
Filed March 18, 1955
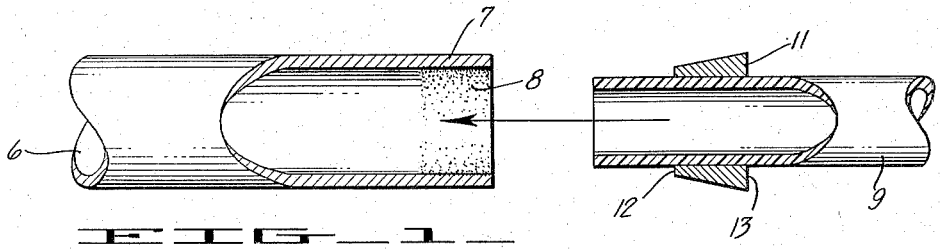
FIG_1_
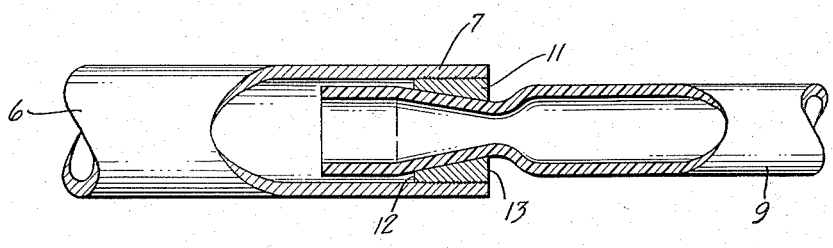
FIG_2_
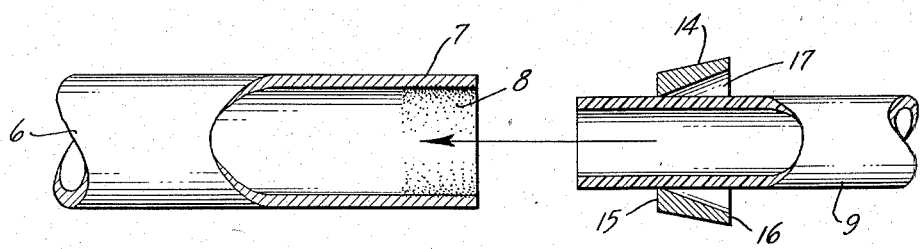
FIG_3_
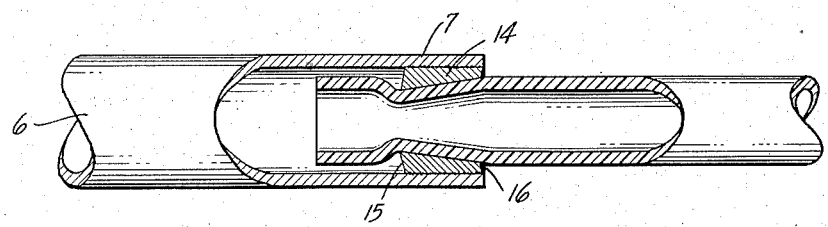
FIG_4_
INVENTOR.
Sherwood Joshua Brady
ECKHOFF & SLICK, Attys.
BY
A member of the firm

United States Patent Office 2,874,981
Patented Feb. 24, 1959

2,874,981

COUPLING BETWEEN RIGID AND NON-RIGID TUBULAR MEMBERS WITH COLLAPSIBLE BUSHING FOR HOLDING THE MEMBERS ASSEMBLED

Sherwood Joshua Brady, Walnut Creek, Calif., assignor to Cutter Laboratories, Inc., a corporation of California Application March 18, 1955, Serial No. 495,206

1 Claim. (Cl. 285—238)

This invention relates to a construction of fluid conduits and particularly to a relatively simple, inexpensive means for joining two conduits in fluid-tight engagement. The invention is further concerned with the joining of a rigid and a non-rigid tube, as are provided in blood transfusion sets and wherein a flexible plastic tube, for example, is used in conjunction with a metallic element having a tubular end, such as a needle, and wherein the joining of these to provide a fluid-tight connection is essential.

It is in general the broad object of the present invention to provide an improved, simple, inexpensive fluid conduit connection, one particularly suited to the joining of an outer rigid tube to a flexible tube of smaller diameter.

The invention includes other objects and features of advantage, some of which, together with the foregoing, will appear hereinafter wherein the present preferred embodiments of this invention are enclosed. In the drawings accompanying and forming a part hereof, Figure 1 is a side elevation partly in section, showing two tubes in position for connection.

Figure 2 is a side elevation partly in section, showing the connection of the tubes shown in Figure 1.

Figure 3 is a side elevation, partly in section, showing two tubes in position for connection but utilizing a modified form of connector.

Figure 4 is a side elevation partly in section showing the parts of Figure 3 assembled.

Referring particularly to Figures 1 and 2, a rigid outer tube such as the tubular end of a needle or the like is indicated at 6. Preferably, the inner surface of terminal end 7 of the rigid tube 6 is roughened as at 8. Another tube has been indicated at 9, this having an outer diameter smaller than the inside diameter of tube 6 so the two tubes can telescope.

In accordance with this invention, connector means 11 is provided upon tube 9 and in Figures 1 and 2, this is shown as a flexible member 11 which has the form of a frustrum of a cone having planar surfaces 12 and 13. Member 11 is provided with an interior bore of such diameter that it fits snugly on tube 9. When it is desired to assemble tubes 6 and 9, connector member 11 is slipped onto tube 9 and is moved along the tube until it is spaced from a terminal end some distance, as appears in Figures 1 and 2. Tube 9 with connector 11 is then forced into the end 7 of tube 6 so that the member 11 is in contact with the roughened surface 8 on the interior of tube 6. The diameter of planar face 12 on member 11 is equal to or is slightly smaller than the interior diameter of tube 6; however, the diameter of planar face 13 is substantially larger than the interior diameter of tube 6, so that, when the tube 9 is forced into position and member 11 is within tube 6, the tube 9 is compressed, as is shown in Figure 2. The outer surface of member 11 then corresponds in shape to the inner cylindrical surface of tube 6, thus compressing the tube 9. Thus, the two tubes are held in juxtaposition and a fluid-tight joint is provided between them, the resiliency of tube 9 further aiding and expanding member 11 within tube 6. The diameter of planar face 13 is insufficient, however, to collapse tube 9 completely for fluid must flow therethrough.

In that form of the invention shown in Figures 3 and 4, connector member 14 is utilized, this also being in the shape of a frustrum of a cone and having planar faces 15 and 16. The interior bore of member 14, as indicated at 17, is, however, in the shape of a frustrum of a cone. Again, the diameter of face 15 is equal to or is only slightly less than the interior diameter of tube 6, while the overall diameter of face 16 is substantially greater than the interior diameter of tube 6 so that when the tube 9 with connector member 14 in place is forced into position within tube 6, tube 9 is compressed, as appears in Figure 4, as is the connector member 14.

The outer rigid tube can be metal or plastic, so long as it is relatively rigid. The connector members 11 and 14 and tube 9 can be of any soft, flexible material such as polyethylene, vinyl, nylon or rubber.

From the foregoing, I believe it will be apparent that I have provided a relatively simple and novel means for connecting two tubes together in a simple, direct and inexpensive manner.

I claim:

In combination, a rigid cylindrical outer tube having a roughened inner surface defining an inner terminal end of said tube, a resilient cylindrical inner tube having one end thereof concentrically positioned within said terminal end of the rigid tube, and a resilient tubular member having the outer surface thereof in surface to surface engagement with the said roughened inner surface and having a tubular bore therein fitting snugly on the inner tube, said member prior to assembly of the joint having the form of a truncated cone, the base of said cone having a diameter greater than that of the bore of the rigid tube the diameter of the bore at the base of the said cone being substantially equal to the outer diameter of the said inner tube, said tubular member being totally confined between the inner tube and the roughened surface of the end of the outer tube to compress the flexible inner tube and retain the inner tube in position in the outer tube, the reduction in diameter of the resilient parts in the assembled joint producing radial forces that maintain the parts assembled.

References Cited in the file of this patent

UNITED STATES PATENTS

| | | |
|---|---|---|
| 1,138,281 | Dodge | May 4, 1915 |
| 1,481,341 | Bersted | Jan. 22, 1924 |
| 2,134,719 | Kocher | Nov. 1, 1938 |
| 2,271,936 | Carson | Feb. 3, 1942 |
| 2,281,594 | Pearl | May 5, 1942 |
| 2,287,889 | Krumsiek | June 30, 1942 |
| 2,326,292 | Dorman | Aug. 10, 1943 |
| 2,359,405 | Cory | Oct. 3, 1944 |
| 2,458,635 | Pitt | Jan. 11, 1949 |
| 2,484,407 | Greenbaum | Oct. 11, 1949 |
| 2,616,729 | Hansen | Nov. 4, 1952 |

FOREIGN PATENTS

| | | |
|---|---|---|
| 806,525 | France | Dec. 18, 1936 |
| 851,287 | Germany | July 8, 1949 |